(12) United States Patent
Jacobi et al.

(10) Patent No.: US 6,249,531 B1
(45) Date of Patent: Jun. 19, 2001

(54) UNIVERSAL VOICE/FAX/MODEM LINE OVER COMPRESSED MEDIA

(75) Inventors: Eli Jacobi, Palo Alto; Peter Kozdon, Santa Clara; Mark Skrzynski, Capitola, all of CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/005,302

(22) Filed: Jan. 9, 1998

(51) Int. Cl.[7] ....................................... H04J 3/16
(52) U.S. Cl. ............................ 370/477; 370/526
(58) Field of Search .................... 370/465, 466, 370/477, 487, 522, 526, 527, 419, 420, 463, 493, 494, 495, 468; 379/93.05, 93.06, 93.07, 93.08, 93.09, 93.11; 375/222; 704/500

(56) References Cited

U.S. PATENT DOCUMENTS

| | | | |
|---|---|---|---|
| 5,528,595 | 6/1996 | Walsh et al. | 370/85.13 |
| 5,555,377 | * 9/1996 | Christensen et al. . | |
| 5,577,105 | 11/1996 | Baum et al. | 379/93 |
| 5,617,423 | * 4/1997 | Li et al. | 370/426 |
| 5,636,218 | * 6/1997 | Ishikawa et al. | 370/401 |
| 5,646,946 | * 7/1997 | Van der Meer et al. | 370/442 |
| 5,666,487 | * 9/1997 | Goodman et al. | 709/246 |
| 5,682,386 | 10/1997 | Arimilli et al. | 370/468 |
| 5,940,479 | * 8/1999 | Guy et al. | 379/93.01 |
| 5,940,598 | * 8/1999 | Strauss et al. | 370/466 |
| 5,946,323 | * 8/1999 | Eakins et al. | 370/468 |
| 5,999,898 | * 12/1999 | Richton | 704/217 |

* cited by examiner

*Primary Examiner*—Douglas Olms
*Assistant Examiner*—Ken Vanderpuye

(57) ABSTRACT

An apparatus and method for selectively compressing information to be transmitted over a communications network includes an analog line monitor connected to an analog telephone and an analog data communications device. The analog line monitor is configured for detection of carrier tone signals associated with data transmissions. An analog-to-digital/digital-to-analog (AD/DA) converter is connected to the analog line monitor to convert the information contained in transmissions from the analog telephone and the analog data communications device from an analog format to a digital format. Optionally, the AD/DA circuitry is configured for demodulating data prior to transmission over the network. Compression circuitry is responsive to detection of a carrier tone signal by the analog line monitor, such that detection of a carrier tone signal suppresses compression of data transmitted by the data communications device. A transmitting device is connected to the AD/DA converter and to the compression circuitry to transmit information generated by the analog telephone and the analog data communications device to a remotely located communications device. A preferred embodiment includes a digital line monitor connected to a digital communications device. Decompression circuitry is connected to the digital line monitor to decompress information transmitted by the digital communications device. A signaling information extractor is connected to the decompression circuitry to extract signaling information from the decompressed digital information. The transmitting device transmits the information received by the digital line monitor.

18 Claims, 5 Drawing Sheets

UNIVERSAL VOICE/FAX/MODEM LINE OVER COMPRESSED MEDIA

BACKGROUND OF THE INVENTION

The invention relates generally to an interface between a telecommunications network and a data communications network, and more specifically to an interface between an analog telephone network and a digital data communications network for facilitating transmission of compressed voice information via the digital data network.

DESCRIPTION OF THE RELATED ART

Recent technological innovations in telecommunications and data network technology have begun to blur the distinctions between telecommunications and data communications. The advent of Internet Protocol (IP) telephony has opened up networks such as Local Area Networks (LANs), intranetworks, internetworks, and the Internet, which were originally designed for data communication, to be utilized for audio communication as well. The promulgation of the H.323 standard for transmitting non-telephone signals by the International Telecommunications Union (ITU) provides a standard for IP telephony which obviates many of the compatibility problems between different IP telephonic devices which previously hindered utilization of IP telephony.

IP telephony has made it possible to connect both analog and digital telephone networks. The network access servers facilitating the connections between these networks enable communication between devices which previously were incompatible, such as an analog telephone and a computer on a LAN enabled for IP telephony. Likewise, an analog fax can exchange data with a digital fax on a LAN.

Compression algorithms are well known for compressing voice information transmitted over digital networks, such as LANs. Compression of voice information represents a significant economic benefit, as compressed voice occupies a much smaller bandwidth than uncompressed voice, thereby enabling many conversations to be multiplexed on a single channel. Compression algorithms such as G.723 are known as lossy compression algorithms because, with each successive compression, a measurable quantity of the information contained within a transmission is lost. The amount of information loss is not significant enough to perceptibly affect the quality of voice telephony communication. However, data transmitted by fax machines and modems are corrupted by lossy compression algorithms.

A problem arises when an IP telephony network user wishes to have both an analog data communications device, such as a fax or a modem, and an analog telephone connected to the IP telephony network. Currently, the user is presented with two options in this situation. The analog telephone and the fax or modem can be connected to separate lines, a compressed line and a non-compressed line, thereby enabling compression of the voice information transmitted by the telephone while preventing corruption of the data transmitted by the fax or modem. However, leasing separate lines represents a potentially significant extra expense for the user. Furthermore, many modern fax machines feature a telephone integrally constructed within the same unit so that the two devices must share the same telephone line. The user is required to physically change connections between the compressed line and the non-compressed line when switching from the fax feature to the telephone feature. A second alternative is to utilize a single non-compressed line for transmitting both telephone and fax or modem calls. This alternative deprives the user of the benefits of compressed voice transmissions.

With reference to FIGS. 1 and 2, the limitations of the prior art network access servers are evident in the unfavorable line configurations connecting an analog telephone 12, a modem 14 contained in a computer such as a PC, and a fax machine 16. In FIG. 1, a network access server 18 enabled for generating non-compressed transmissions to a token ring network 22 is connected to the analog telephone 12, the modem 14, and the fax 16 via a single analog telephone line. Utilizing a non-compressed line for transmitting fax and modem calls reduces the susceptibility of the transmissions to corruption of the data contained therein. Although a user is able to connect both data communications devices and a telephone to the same telephone line by utilizing the non-compressing network access server 18, the user is also denied the benefits of compressed voice transmissions.

FIG. 2 illustrates an alternative prior art configuration of analog data and voice communications devices connected to the token ring network 22. The fax 16 and modem 14 are connected to the token ring network via the non-compressing network access server 18, whereas the analog telephone 12 is connected via a compressing network access server 20. The user thus derives the benefits of the compressed voice transmissions. However, the user also incurs the expense of an additional line. Furthermore, if the fax has an attached telephone, switching from the fax mode to the telephone mode requires disconnecting from the non-compressed line and connecting to the compressed line.

What is needed is a universal line capable of detecting different types of media, thereby facilitating selective compression of voice information for transmission over an IP telephony network.

SUMMARY OF THE INVENTION

An apparatus for selectively compressing information to be transmitted over a communications network includes an analog line monitor connected to multiple communications devices, including an analog telephone and a data communications device. The analog line monitor is configured for detecting carrier tone signals associated with a data transmission generated by the data communications device. An analog-to-digital/digital-to-analog (AD/DA) converter is connected to the analog line monitor and is enabled to convert the information contained in calls generated by the communications devices from an analog format to a digital format. Compression circuitry is responsive to detection of the carrier tone signal by the analog line monitor, such that detection of the carrier tone signal triggers an inactive mode, wherein compression of data transmitted by the data communications device is suppressed. Optionally, the ADIDA converter is enabled to demodulate data prior to transmission of the data over the communications network. A transmitting device is connected to the ADIDA converter and to the compression circuitry to transmit information generated by the analog telephone and the analog data communications device to a remotely located communications device.

A preferred embodiment includes a digital line monitor connected to a digital communications device. Decompression circuitry is connected to the digital line monitor and is configured for decompressing information contained in a digital transmission generated by the digital communications device. A signaling information extractor is connected to the decompression circuitry to extract signaling information from the decompressed digital information contained in the digital transmission. A signaling log is connected to the signaling information extractor and has memory for storing signaling information extracted by the decompression circuitry. The transmitting device transmits digitally formatted information converted by the AD/DA converter and the digital information contained in the digital transmission received by the digital line monitor to a remotely located terminal.

A method for selectively compressing voice information to be transmitted over a communications network includes a step of monitoring an analog telephone line connected to the communications network for carrier tone signals associated with data transmissions. A call is received via the analog telephone line from a communications device containing information to be transmitted over the communications network, and a determination is made as to whether the call has an associated carrier tone signal. If the call has no associated carrier tone signal, the information contained in the call is compressed. Optionally, if the call has an associated carrier tone signal, the information contained in the call is demodulated prior to transmission over the communications network.

One embodiment of the method includes receiving a digital transmission over a digital line. If this information is already compressed, then the information contained in the digital transmission is stored in a buffer, a copy of the information is decompressed, and the signaling information is extracted. The compressed information is passed to the network from the buffer, eliminating the need for subsequent compression.

DETAILED DESCRIPTION

Figure 1:
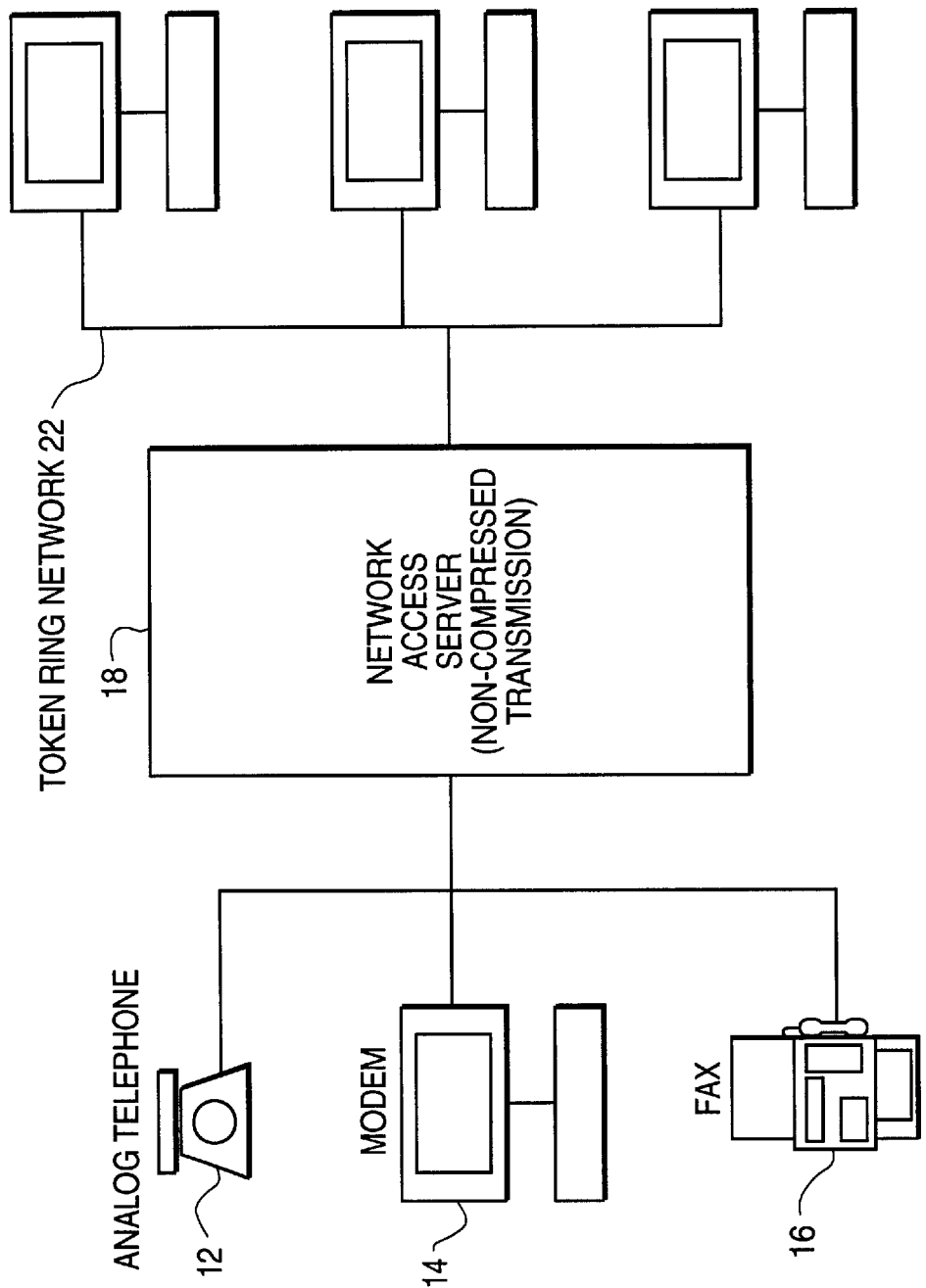
FIG. 1 is a block diagram illustrating a prior art configuration of communications devices connected to a digital data communications network through a non-compressed transmission network access server.
Figure 2:
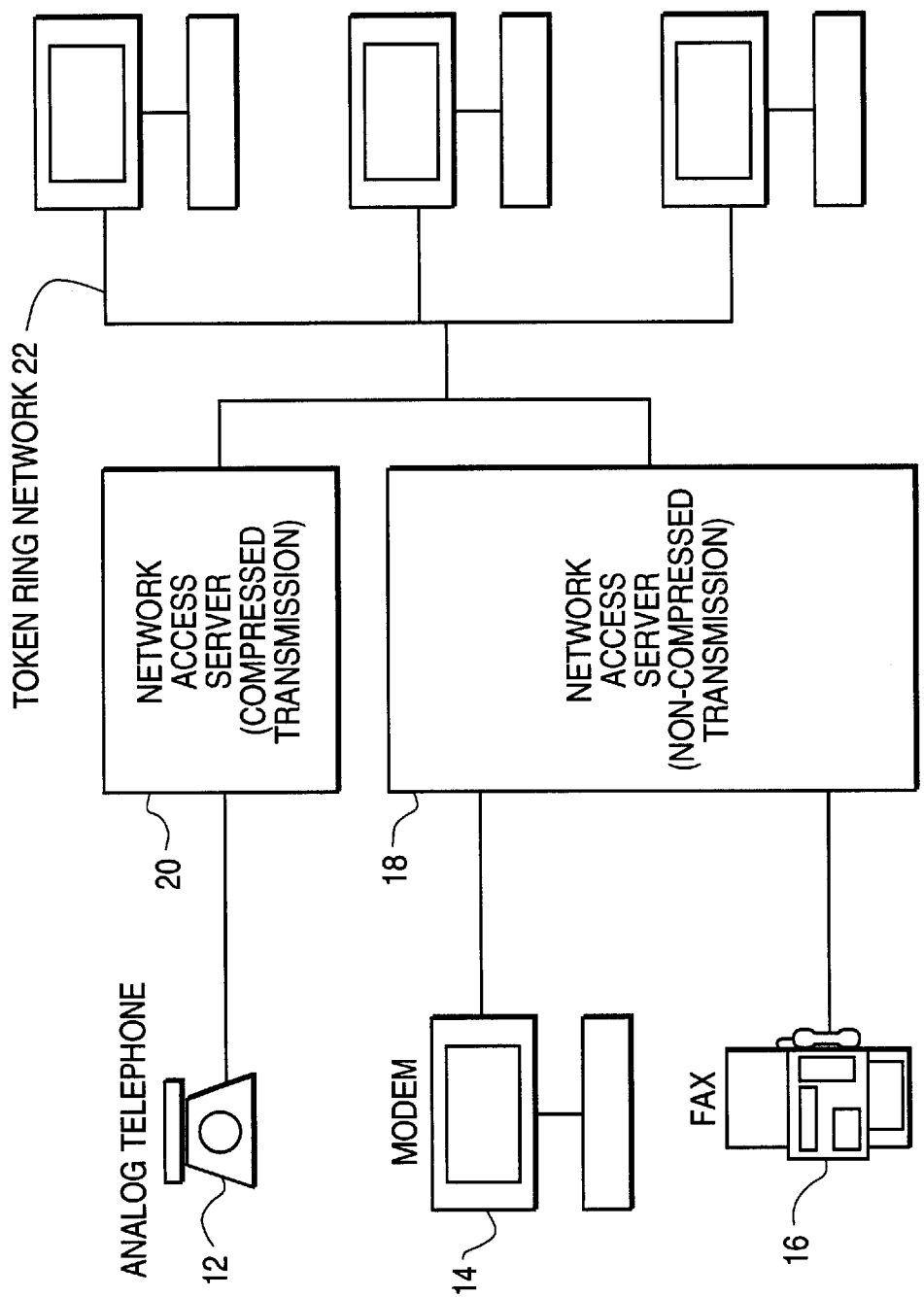
FIG. 2 is a block diagram illustrating an alternative prior art configuration of the same communication devices shown in FIG. 1 wherein an analog telephone is connected to the digital data network through a compressed transmission network access server and a fax and modem are connected through the non-compressing network access server.
Figure 3:
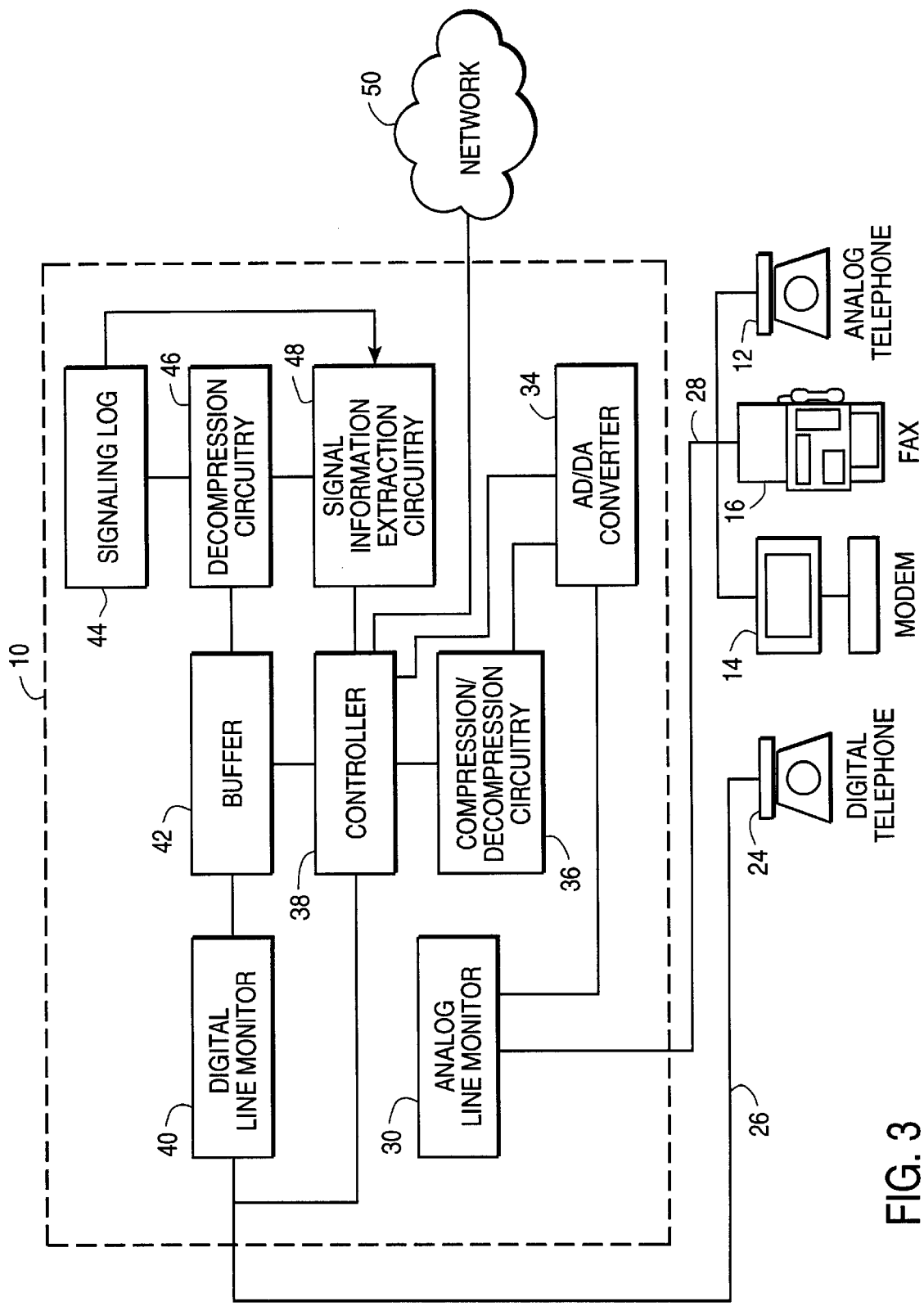
FIG. 3 is a block diagram illustrating a selective compression network access server according to the present invention.

With reference to FIG. 3, a selective compression network access server 10 is connected to an analog telephone 12, two analog data communications devices, such as a modem 14 and a fax 16 via an analog telephone line 28. In this embodiment, the server is also connected to a digital telephone 24 supported by a digital line 26. Alternatively, the network access server 10 may be associated with operation of a private branch exchange (PBX), not shown, which supports the above-mentioned communications devices 12, 14, 16 and 24.

The outgoing analog line 28 supporting the analog telephone 12, modem 14, and fax 16 is connected to an analog line monitor 30 which monitors the telephone line for carrier tone signals associated with analog data transmissions. Carrier tone signals are conventionally utilized by analog data communications devices to identify a call as containing data. After establishing a connection to a remote communications device that is to receive data, a sending data communications device transmits a carrier tone signal to alert the remote device of the impending data transmission. Detection of a carrier tone signal by the analog line monitor 30 thus alerts the analog line monitor 30 that a data transmission will follow.

An analog-to-digital/digital-to-analog (ADIDA) converter 34 is connected to the analog line monitor 30 to convert the analog signals contained in calls from the analog communications devices 12, 14, and 16 to digital signals for transmission over a communications network 50. In a preferred embodiment, the communications network is a digital data network equipped for Internet Protocol (IP) telephony. Lossy compression algorithms, such as G.723.1, are commonly utilized to compress voice information prior to transmission of the voice information to a terminal on the IP telephony network. As previously noted, lossy compression algorithms are prone to corruption of data. Consequently, the ability of the selective compression network access server 10 to differentiate between analog voice transmissions and analog data transmissions and to selectively compress only voice information makes the selective compression network access server 10 particularly well suited for providing an interface between an IP telephony network and the analog line 28 supporting the fax 16, the modem 14, and the analog telephone 12. Alternatively, the selective compression network access server 10 might be connected to any other network which employs lossy compression algorithms, such as a digital telephone network, or an analog telephone network which employs digital lines to connect the trunk sides of central offices.

The AD/DA converter 34 is connected to compression/decompression circuitry 36 for selective compression of voice information. The analog line monitor 30 communicates with the compression/decompression circuitry 36 to direct the compression/decompression circuitry to only compress voice information and not data. The compression/decompression circuitry 36 utilizes a lossy compression algorithm such as G.723.1, G.728, or G.729 to compress voice information. The compression/decompression circuitry 36 is connected to a controller 38 to transfer any signaling information necessary to route the voice information in a call from the analog telephone 12 to the remotely located communications device on the network 50. Signaling protocols for routing a transmission generated by an analog communications device to a terminal on a digital data network, a digital telephone network, or an analog telephone network are well known. The compression/decompression circuitry 36 also transfers digitized and packetized voice information to the controller 38 for transmission to the remotely located communications device.

Because the compression/decompression circuitry 36 does not process data contained in a transmission from the fax 16 and the modem 14, the ADIDA converter 34 is connected directly to the controller 38 to transfer the data and any signaling information the controller 38 requires to route the data to a remote communication device on the network 50. Preferably, the AD/DA converter 34 is configured to selectively demodulate data contained in transmissions from both the fax 16 and the modem 14. Local demodulation of the data frees the remote communications device to which the data is transmitted from having to perform the demodulation. The AD/DA converter 34 is also configured to packetize the data and include signaling information which causes a controller 38 to alert a remote receiving terminal that the data has been locally demodulated.

When the network access server 10 receives a transmission from a remote communications device, the ADIDA converter 34 converts the information contained in the transmission from a digital format into an analog format compatible with the analog communications devices 12, 14, and 16. The compression/decompression circuitry 36 decompresses voice information transmitted from the remotely located terminal. If the voice information is not decompressed prior to being converted to an analog format, the voice information would not be intelligible to a user of the analog telephone 12.

The selective compression network access server 10 is able to provide access to the analog telephone 12, the analog fax 16, and the modem 14 over a single line with voice compression capability because the carrier tone signals that are conventionally associated with data transmissions distinguish fax and modem calls from analog telephone calls. If the analog line monitor 30 detects no carrier tone signal in a call, it is established that the call is a telephone call containing voice information which will be compressed prior to transmission to the remote communications device. The voice information is transferred from the analog line monitor 30 to the ADIDA converter, which digitizes the voice information and transfers the voice information to the compression/decompression circuitry 36. The compression/decompression circuitry 36 compresses and packetizes the voice information for efficient transmission over the network 50 by the controller 38. As previously mentioned, compression and packetization of voice information enables more efficient transmission over the network 50 because the compressed voice information occupies less bandwidth than would the same voice information if it were uncompressed.

The network access server 10 is also configured to provide an interface between the digital telephone 24 and a communications device connected to the network 50. Although a digital telephone 24 is shown in FIG. 3, a computer or a digital fax can be substituted. Providing a network access server capable of interfacing both analog and digital telephone lines to the network 50 is preferred, because a PBX will often support both digital and analog network connections. Thus, in the embodiment in which the network access server 10 is located on the front end of a PBX, the network access server 10 is able to interface both digital and analog lines to the network 50, instead of utilizing separate network access servers for the analog and digital lines.

A digital line monitor 40 monitors transmissions from the digital telephone 24 supported by the digital line 26 and is able to determine if information received in the call is compressed or not. A buffer 42 provides temporary storage of information contained in a transmission until the information is transmitted to the network 50 or, in the case of uncompressed voice, via the compression circuitry 36. Decompression circuitry 46 receives a copy of the information stored in the buffer 42. The decompression circuitry 46 is in communication with the digital line monitor 40 so that the decompression circuitry is activated only if the information contained in the digital call is determined to be compressed. Signal information extraction circuitry 48 is connected to the decompression circuitry to extract signaling information from the information contained in the transmission. A signaling log 44 is connected to the signal extraction circuitry 48 and has a memory for storing information such as the address to which a call was directed, the time at which the connection was established, and the duration of the connection. The signal extraction circuitry 48 is also connected to the controller 38 to provide the necessary signaling information for routing a transmission to a terminal on the network 50.

The controller 38 has at least two configurations for receiving a transmission from a terminal on the network 50 which is directed to the digital telephone 24; one in which the controller 38 is connected directly to the digital line 26 which supports the digital telephone, and the other in which the controller is configured for transferring the information to the buffer 42 for processing by the decompression circuitry 46 and the signal information extraction circuitry 48. The controller 38 may route a call directly to the digital line 26, if it is not a priority to maintain a log of signaling information for calls directed from terminals on the network 50 to the digital telephone. If maintaining such a log is desired, the controller is configured to transfer the information to the buffer 42 for processing. The information is stored temporarily in the buffer 42, and a copy of the information is generated and transferred to the decompression circuitry where it is decompressed and transferred to the signal information extraction circuitry. The extracted signaling information is then stored in the signaling log 44.

Figure 4:
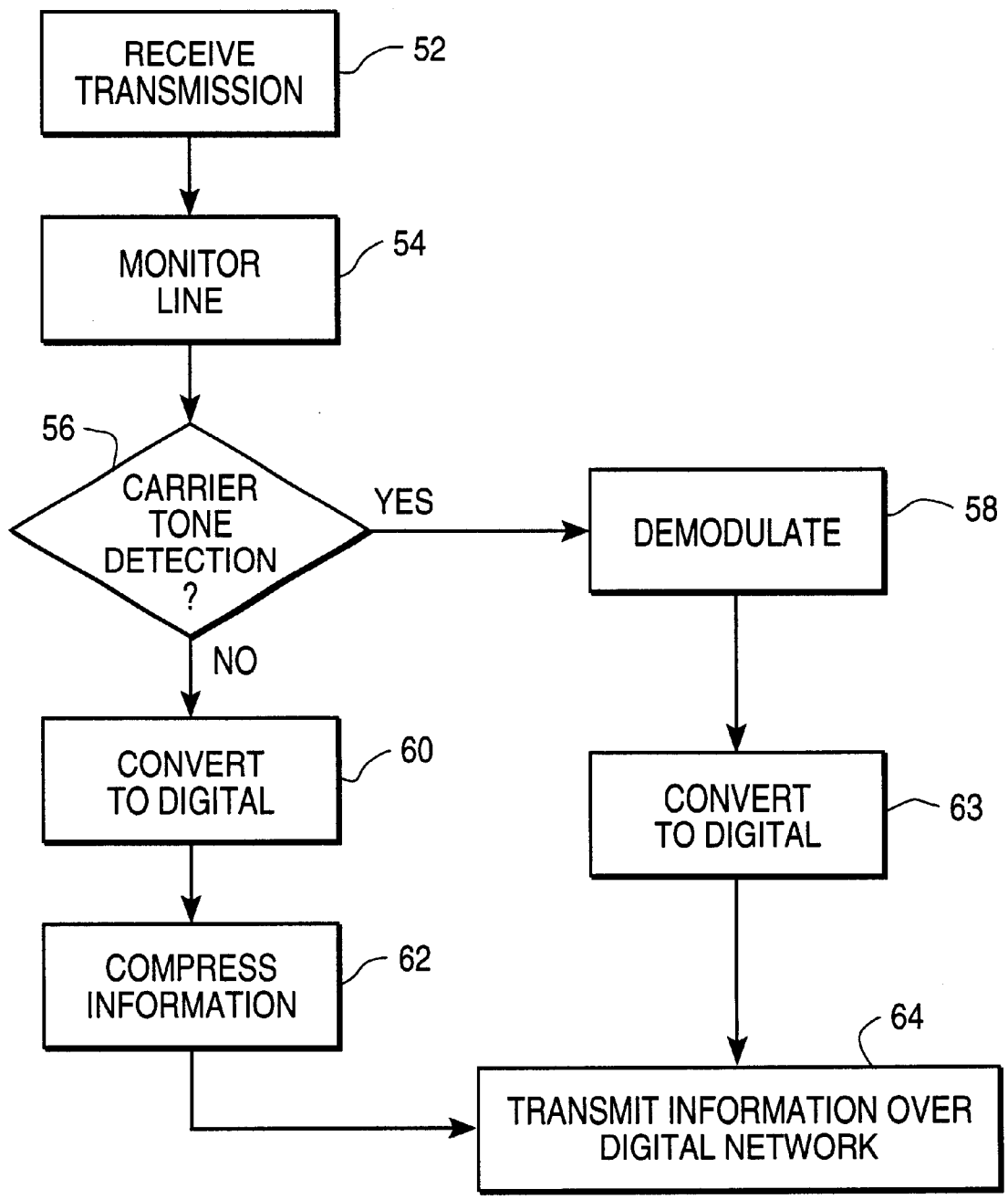
FIG. 4 is a flow diagram of a method for selective compression of voice information utilizing the selective compression network access server illustrated in FIG. 3.

With reference to FIG. 4, a method for selectively compressing voice information utilizing the network access server 10 of FIG. 3 includes receiving an analog transmission from an analog communications device, such as the analog telephone 12, the modem 14, or the fax 16 in step 52 over the analog line 28. The analog line 28 supporting the analog telephone 12, the fax 16, and the modem 14 is monitored for the presence of carrier tone signals in step 54. A determination is made as to whether a call has an associated carrier tone signal in step 56. If the call has no associated carrier tone signal, it is determined that the call contains voice information transmitted by the analog telephone 12 and the voice information will be compressed prior to transmission to a terminal connected to the network 50. In step 60, the voice information is converted from an analog format to a digital format by the AD/DA converter 34 to provide the information with the appropriate format for transmission over the network 50. The digitized voice information is compressed in step 62 to enable multiplexing of multiple conversations over the same channel. In step 64, the controller 38 transmits the voice information to the remotely located terminal.

If, in step 56, a carrier tone signal is detected, it is determined that the call was generated from either the fax 16 or the modem 14, and consequently it is unnecessary to compress the data within the call. In step 58, the data is demodulated. Demodulation of the data at the server 10 is not critical to practicing the invention. However, it may be performed to save the terminal receiving the data from having to perform the demodulation. Signals must be transmitted by the controller 38 to indicate that the data being transmitted has already been demodulated to avoid an unnecessary second demodulation of the information by the receiving terminal. The data is then converted to a digital format in step 63 by the analog-to-digital converter 34. In step 64, the data is transmitted to a terminal on the network 50.

Figure 5:
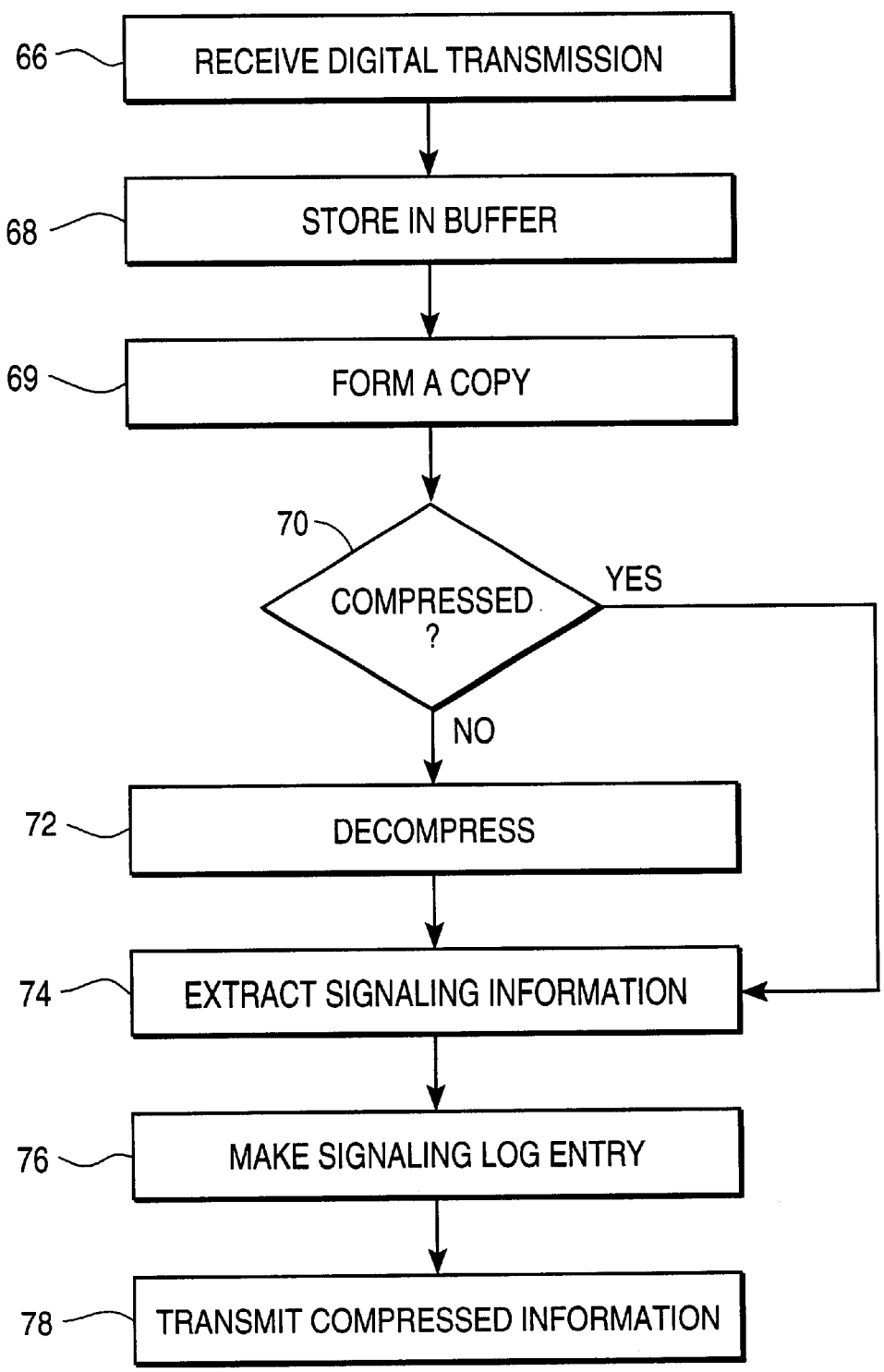
FIG. 5 is a flow diagram of a method for transmitting compressed digital information over a digital data network utilizing the selective compression network access server shown in FIG. 3.

With reference to FIG. 5, a method for transmitting digital information received over the digital line 26 of FIG. 3 to a terminal on the network 50 includes receiving a digital transmission from the digital telephone 24 in step 66. The information contained in the transmission is stored in the buffer 42 in step 68, and a copy of the information in the transmission is formed in step 69. It is determined in step 70 whether the information contained in the transmission is compressed. If the information is compressed, a copy of the information in the transmission is formed in step 71 and the decompression circuitry 46 decompresses the copy of the information in step 72. If the information is not compressed, the copy formation decompression steps are bypassed for a signal information extracting step 74. The decompression circuitry 46 extracts signaling information for storage in the signaling log 44 and for use by the controller 38 in routing the transmission to the correct terminal on the network 50.

Signaling information is entered into the signaling log 44 in step 76 to record information such as the calling endpoint, the called endpoint, the time that the call was made, and the duration of the call. In step 78, the signaling information is used by the controller 38 to route the transmission to the remotely located terminal. The original information contained in the call, which was stored in the buffer 42 in step 68, is transmitted over the network 50 in step 78. As previously noted, transmission of the information stored in the buffer 42 is preferable to recompression of the decompressed information, because the compression procedure may induce information loss.

What is claimed is:

1. An apparatus for selectively compressing information comprising:

monitoring means for detecting carrier tone signals transmitted along a common analog connection that supports a plurality of local communications devices including a local analog data communications device and a local analog telephone, said carrier to the signals being indicative of completion of a connection between said local analog data communications device and a target remotely located analog data communications device;

compression means responsive to said monitoring means for compressing voice information contained in a call from said local analog telephone, said compression means having a plurality of modes of operation, including an active mode for compression of said voice information contained in said local analog telephone call and an inactive mode for maintaining user data contained in a transmission from said local analog data communications device in a constant compression state, said inactive mode being automatically triggered by detection of a carrier tone signal by said monitoring means; and transmitting means, in communicative contact with said compression means, for transmitting said compressed voice information and said user data to target remotely located communications devices.

2. The apparatus of claim 1 further comprising an analog-to-digital/digital-to-analog (AD/DA) converter having an input to said common analog connection and having an output connected to said compression means, said output of said AD/DA converter providing a digitized signal to said compression means, said AD/DA converter being responsive to said monitoring means to initiate a demodulation and digtization of said user data transmitted from said local analog data communications device prior to transfer of said user data to said transmitting means.

3. The apparatus of claim 1 wherein said local communications devices include at least one of a fax and a modem.

4. The apparatus of claim 1 further comprising an analog-to-digital (AD) converter connected to digitize said voice information and said user data, said transmitting means being connected to transmit said digitized compressed voice information and said digitized user data to a local area network, said local analog telephone and said local analog data communications device being supported by one of a private branch exchange and a public switched telephone network.

5. The apparatus of claim 1 further comprising:

a digital line supported by said apparatus;

means for detecting a transmission from a local digital communications device via said digital line, wherein said transmission is an outgoing transmission to be directed to a remote digital device by said transmitting means;

means, connected to said detecting means and said transmitting means, for decompressing digital information contained in said outgoing transmission; and extracting means connected to said decompressing means for extracting signaling information contained in said decompressed digital information, said extraction of said signaling information triggering a transfer of said outgoing transmission by said transmitting means.

6. The apparatus of claim 5 further comprising a signaling log connected to said extracting means, said signaling log having a memory for storage of said signaling information extracted by said extracting means.

7. The apparatus of claim 5 further comprising a buffer having an input, a first output, and a second output, said input being configured to receive said outgoing transmission, said first output being configured to transfer said digital information contained in said outgoing transmission to said decompressing means, said second output being configured to transfer said digital information in a compressed state to said transmitting means upon said extraction of said signaling information.

8. The apparatus of claim 7 wherein said transmitting means includes a control device responsive to said signaling information extracted by said extraction means, said control device being configured to route said outgoing transmission from said local digital communications device to said remote device based upon said extracted signaling information.

9. A method for selective compression of information to be transmitted from a locally supported analog communications device to a remotely located communications device, said method comprising the steps of:

detecting an analog transmission exchanged between said locally supported analog communications device and said remotely located communications device;

determining whether said analog transmission contains a carrier tone signal indicative of a call connection in which transmissions of user data between said locally supported analog communications device and said remotely located communications device have an absence of voice information;

compressing information contained in said transmissions from said locally supported analog communications device only if it is determined that said information is voice information; and transmitting said information contained in said transmissions to said remotely located communications device.

10. The method of claim 9 further comprising the step of:

if it is determined that said analog transmission is indicative of a call connection in which said transmissions have an absence of voice information, performing demodulation and digitization of information contained in said transmissions prior to transmitting said information as digitized data to said remotely located communications device, thereby enabling said remotely located communications device to process said digital data in a demodulated condition.

11. The method of claim 9 further comprising the step of:

digitizing said information contained in said transmissions prior to said transmission step.

12. The method of claim 9 further comprising digital processing steps that are enabled for concurrent implementation with said steps involving said analog transmission, said digital processing steps including:

receiving a digital transmission from a digital communications device over a digital line for transmission to said remotely located communications device;

decompressing digital information contained in said digital transmission;

extracting signaling information contained in said digital transmission; and routing said digital transmission to said remotely located communications device based upon said extracted signaling information.

13. The method of claim 12 comprising the further steps of:

storing said digital transmission in a buffer;

forming a copy of said digital information contained in said digital transmission for said decompression and said extraction of said signaling information; and transmitting original compressed digital transmission stored in said buffer to said remotely located communications device.

14. The method of claim 12 wherein said extracting step includes entering said signaling information into a signaling log.

15. An apparatus for selectively compressing information to be transferred to a remote communication device comprising:

an analog line monitor connected to a plurality of communications devices including an analog telephone and at least one of an analog fax machine and a modem, said analog line monitor being configured for detecting a carrier tone signal associated with a data transmission by one of said fax machine and said modem;

compression circuitry responsive to detection of said carrier tone signal by said analog line monitor, said detection of said carrier tone signal triggering suppression of data compression by said compression circuitry, said compression circuitry remaining active in the absence of said carrier tone signal;

a digital line monitor connected to a digital communications device;

decompression circuitry responsive to detection of a compressed digital transmission by said digital line monitor, said decompression circuitry being configured for decompression of digital information contained in said digital transmission;

a signaling information extractor having an input and an output, said input being configured for reception from said decompression circuitry of decompressed digital information contained in said digital transmission, said output being configured for transmission of extracted signaling information;

a signaling log having memory for storage of said signaling information extracted by said signaling information extractor; and means for transmitting information received by said analog line monitor and said digital transmission received by said digital line monitor to said remote communication device.

16. The apparatus of claim 15 further comprising an AD/DA converter that is responsive to detection of said carrier tone signal by said analog line monitor, said detection of said carrier tone signal triggering demodulation of information contained in said data transmission from said one of said fax and said modem.

17. The apparatus of claim 15 further comprising a buffer connected to said decompression circuitry and said transmitting means, said buffer having memory for temporary storage of said digital transmission contemporaneous with decompression of a copy of said digital transmission and extraction of signaling information therefrom.

18. The apparatus of claim 17 wherein said transmitting means includes a controller responsive to said extracted signaling information, said controller being configured for routing said digital transmission to said remote communications device based upon said extracted signaling information.

* * * * *